(12) United States Patent
Beale et al.

(10) Patent No.: US 12,557,013 B2
(45) Date of Patent: Feb. 17, 2026

(54) COMMUNICATIONS DEVICES AND METHODS

(71) Applicant: Sony Group Corporation, Tokyo (JP)

(72) Inventors: Martin Warwick Beale, Basingstoke (GB); Kazuyuki Shimezawa, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 661 days.

(21) Appl. No.: 17/795,236

(22) PCT Filed: Feb. 12, 2021

(86) PCT No.: PCT/EP2021/053538
§ 371 (c)(1),
(2) Date: Jul. 26, 2022

(87) PCT Pub. No.: WO2021/165161
PCT Pub. Date: Aug. 26, 2021

(65) Prior Publication Data
US 2023/0055108 A1 Feb. 23, 2023

(30) Foreign Application Priority Data

Feb. 17, 2020 (EP) .................................... 20157804

(51) Int. Cl.
*H04W 52/02* (2009.01)
*H04W 76/28* (2018.01)

(52) U.S. Cl.
CPC ....... *H04W 52/0216* (2013.01); *H04W 76/28* (2018.02)

(58) Field of Classification Search
CPC ............. H04W 52/0216; H04W 76/28; H04W 52/0219; H04W 76/14; Y02D 30/70
See application file for complete search history.

(56) References Cited

U.S. PATENT DOCUMENTS

| 2021/0037468 | A1* | 2/2021 | Huang | ................. | H04W 72/044 |
| 2021/0059005 | A1* | 2/2021 | Hosseini | ............... | H04W 76/28 |

(Continued)

FOREIGN PATENT DOCUMENTS

| EP | 3499975 A1 | 6/2019 |
| EP | 3512118 A1 | 7/2019 |
| KR | 10-2020-0013960 | * 2/2020 |

OTHER PUBLICATIONS

International Search Report and Written Opinion mailed on Feb. 12, 2021, received for PCT Application PCT/EP2021/053538 filed on Apr. 30, 2021, 9 pages.

(Continued)

*Primary Examiner* — Sharmin Chowdhury
(74) *Attorney, Agent, or Firm* — XSENSUS LLP

(57) ABSTRACT

A communications device including a receiver configured to receive signals within sidelink communications resources of a plurality of resource pool instances of a sidelink interface, each of the resource pool instances being arranged in time in accordance with a resource pool periodicity, and a controller. The controller is configured in combination with the receiver to switch at a first periodic rate between a primary active operating mode and a primary reduced power operating mode in accordance with a primary discontinuous reception, DRX, operation, to monitor for signals transmitted by the other communications devices to the receiving communications device in one or more of the resource pool instances during the primary active operating mode, and to stop monitoring for signals transmitted by the other communications devices to the receiving communications device in one or more of the resource pool instances during the primary reduced power operating mode.

18 Claims, 10 Drawing Sheets

(56) References Cited

U.S. PATENT DOCUMENTS

| | | | | |
|---|---|---|---|---|
| 2022/0353948 A1* | 11/2022 | Luo | .................... | H04W 72/23 |
| 2022/0408514 A1* | 12/2022 | Luo | .................... | H04W 72/25 |
| 2023/0064488 A1* | 3/2023 | Han | .................... | H04W 76/28 |
| 2023/0107246 A1* | 4/2023 | Kang | .................... | H04W 52/02 |
| | | | | 370/329 |

OTHER PUBLICATIONS

Sequans Communications, "Discussion on paging relay and sidelink maintenance", 3GPP TSG-RAN WG2 Meeting #97bis, R2-1703593, Apr. 3-7, 2017, 8 pages.

Holma et al., "LTE for UMTS OFDMA and SC-FDMA Based Radio Access", John Wiley & Sons, 2009, 232 pages.

NTT DOCOMO Inc., "Revised WID on New Radio Access Technology", 3GPP TSG RAN Meeting #78, RP-172834, Dec. 18-21, 2017, 11 pages.

3GPP, "NR; Study on UE Power Saving (Release 16)", 3GPP TR 38.840 V0.1.0, Nov. 2018, pp. 1-24.

3GPP, "Evolved Universal Terrestrial Radio Access (E-UTRA) and Evolved Universal Terrestrial Radio Access Network (E-UTRAN); Overall description; Stage 2 (Release 16)", 3GPP TS 36.300 V16.0.0, Dec. 2019, pp. 1-366.

3GPP, "NR; Medium Access Control (MAC) protocol specification (Release 15)", 3GPP TS 38.321 V15.4.0, Dec. 2018, pp. 1-77.

3GPP, "Evolved Universal Terrestrial Radio Access (E-UTRA) and Evolved Universal Terrestrial Radio Access Network (E-UTRAN); Overall description; Stage 2 (Release 15)", 3GPP TS 36.300 V15.7.0, Sep. 2019, pp. 1-365.

* cited by examiner

COMMUNICATIONS DEVICES AND METHODS

CROSS-REFERENCE TO RELATED APPLICATIONS

The present application is based on PCT filing PCT/EP2021/053538, filed Feb. 12, 2021, which claims priority to EP 20157804.4, filed Feb. 17, 2020, the entire contents of each are incorporated herein by reference.

BACKGROUND

Field of Disclosure

The present disclosure relates generally to communications devices and methods of operating communications devices and specifically to communications devices configured to communicate with other communications device via device-to-device (D2D) communications via a sidelink interface.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

One aspect of both LTE and NR is direct device-to-device (D2D) communications between two communications devices, where some of the signals are not transmitted to or from a base station. Such D2D communications are also referred to as sidelink communications, and signals are transmitted directly between communications devices over a sidelink interface.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a communications device. The communications device (which is a receiving communications device) comprises a receiver configured to receive signals from one or more other communications devices within sidelink communications resources of a plurality of resource pool instances of a sidelink interface, each of the resource pool instances being arranged in time in accordance with a resource pool periodicity, and a controller. The controller is configured in combination with the receiver to switch at a first periodic rate between a primary active operating mode and a primary reduced power operating mode in accordance with a primary discontinuous reception, DRX, operation, to monitor for signals transmitted by the other communications devices to the receiving communications device in one or more of the resource pool instances during the primary active operating mode, and to stop monitoring for signals transmitted by the other communications devices to the receiving communications device in one or more of the resource pool instances during the primary reduced power operating mode. The first periodic rate is dependent on the resource pool periodicity.

Embodiments of the present technique, which further relate to methods of operating communications devices and circuitry for communications devices, allow for the reduction of battery power consumption for sidelink/D2D communications.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
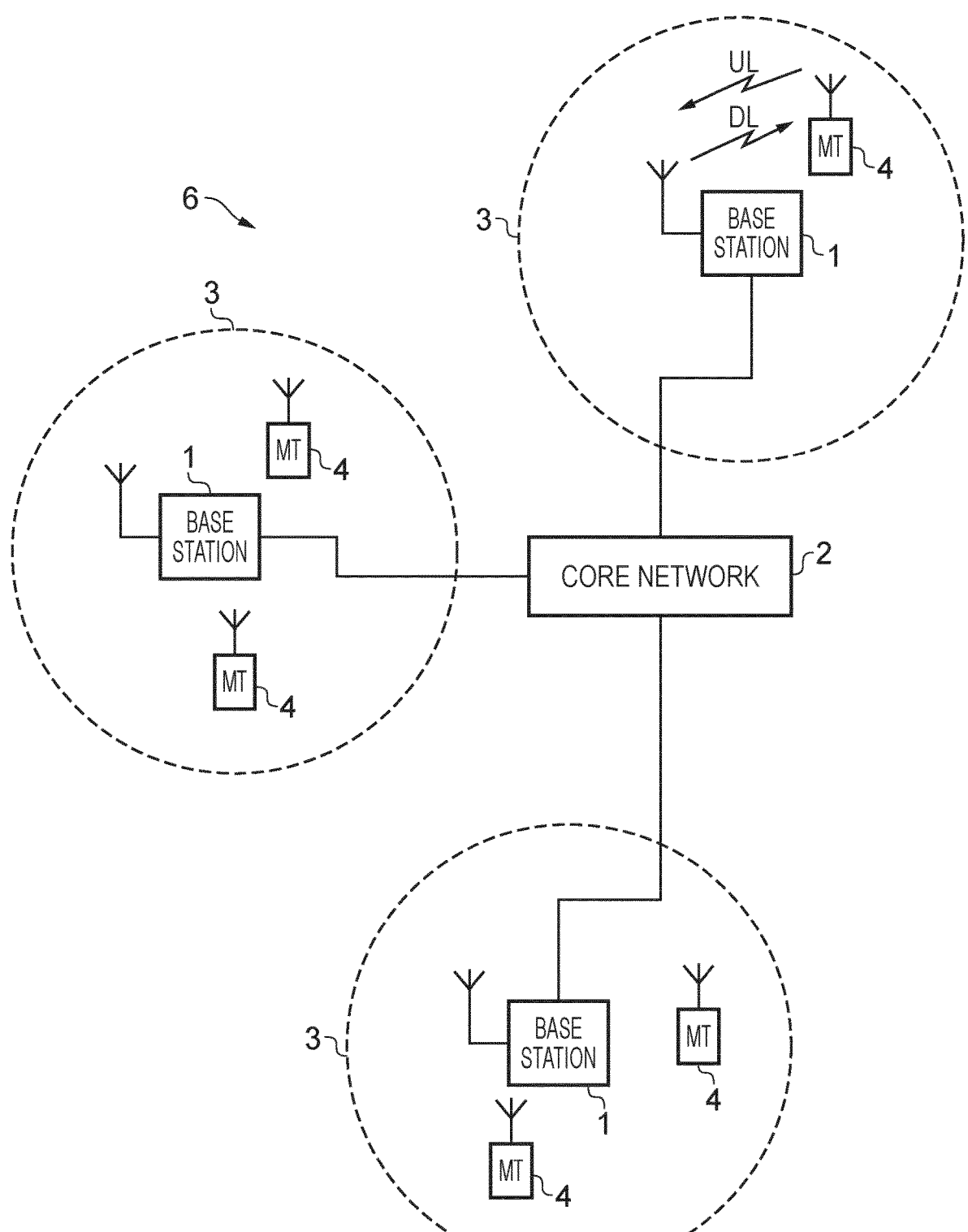
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from terminal devices 4. Data is transmitted from base stations 1 to terminal devices 4 within their respective coverage areas 3 via a radio downlink (DL). Data is transmitted from terminal devices 4 to the base stations 1 via a radio uplink (UL). The core network 2 routes data to and from the terminal devices 4 via the respective base stations 1 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [2]

eMBB services are characterised by high capacity with a requirement to support up to 20 Gb/s. The requirement for URLLC is a reliability of $1\text{-}10^{-5}$ (99.999%) for one transmission of a relatively short packet such as 32 bytes with a user plane latency of 1 ms.

The elements of the wireless access network shown in FIG. 1 may be equally applied to a 5G new RAT configuration, except that a change in terminology may be applied as mentioned above.

Figure 2:
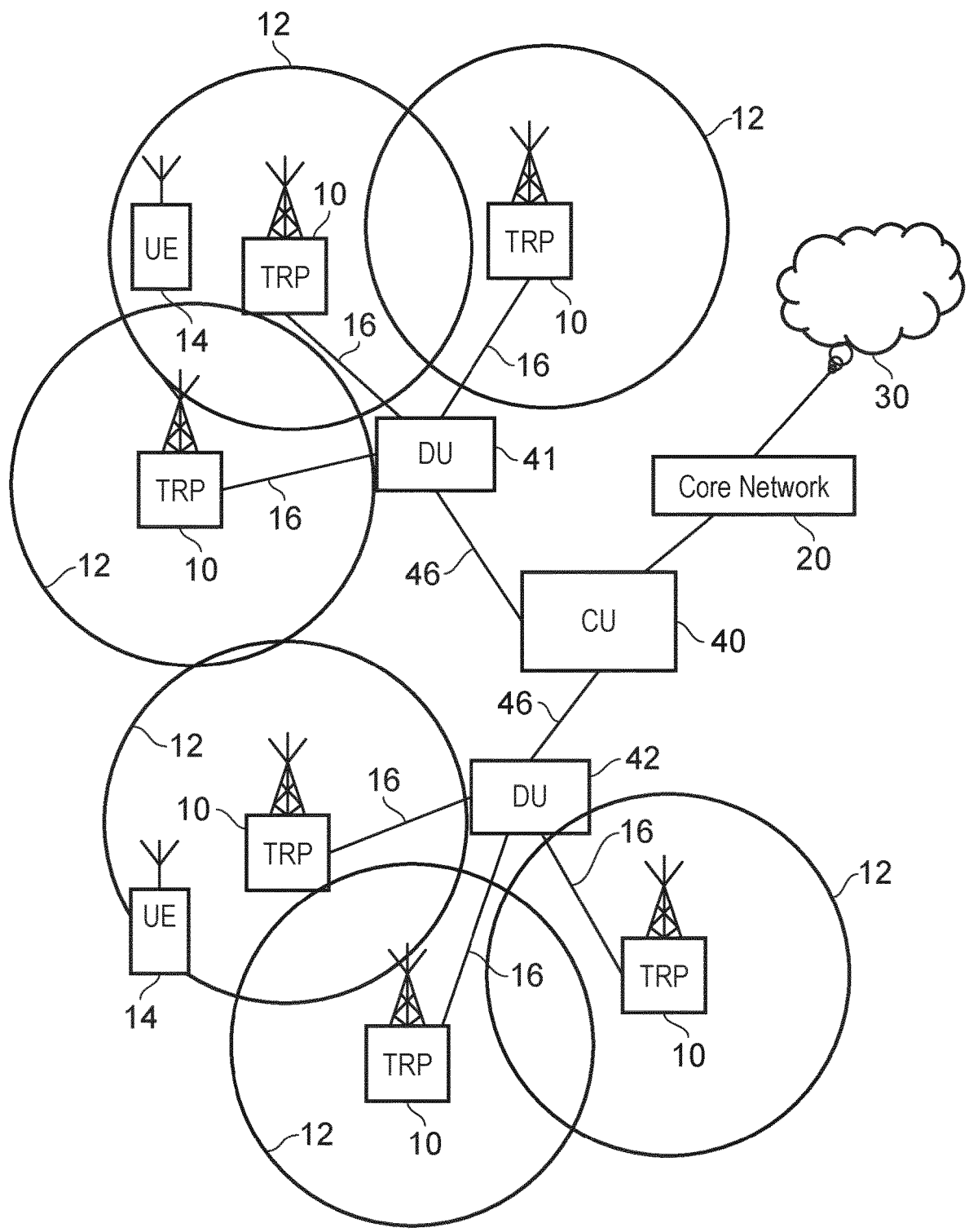
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signaling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure herein may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or distributed control unit 41 and/or a TRP 10 of the kind shown in FIG. 2 which is adapted to provide functionality in accordance with the principles described herein.

Figure 3:
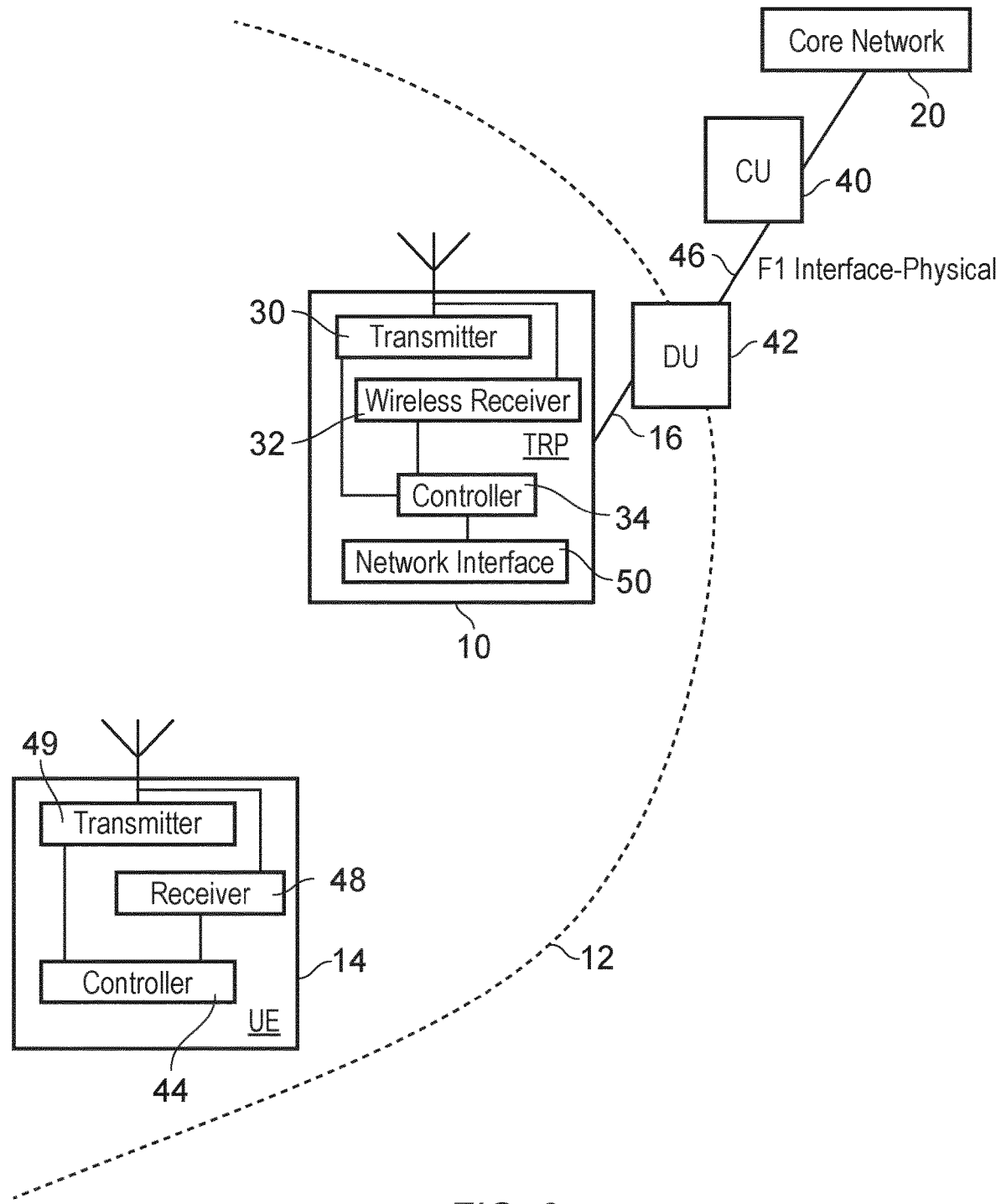
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/ circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signaling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Power Saving and Discontinuous Reception (DRX) in NR

In a typical currently deployed network, idle mode terminal devices are configured to monitor for paging messages periodically. For terminal devices (in connected and idle mode) operating in a discontinuous reception (DRX) mode this occurs when they wake up for their DRX wake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network. In connected mode, the terminal device is configured to periodically monitor PDCCH in groups of slots or subframes. If a PDCCH is not detected during the group of slots or subframes, the terminal device may sleep for the next cycle of the periodicity. Power saving is an important aspect of a user's experience of NR, which will influence the adoption of 5G handsets and/or services. DRX is one method of power saving for NR terminal devices.

Figure 4:
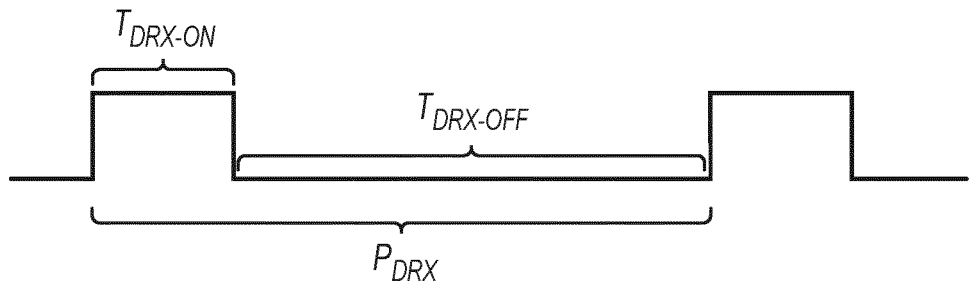
FIG. 4 shows an example of a discontinuous reception (DRX) cycle.

The basic DRX cycle is shown in FIG. 4, which consists of a DRX ON period of duration $T_{DRX-ON}$ and a period of inactivity, i.e. a DRX OFF period of duration $T_{DRX-OFF}$ where the DRX ON period occurs periodically at a DRX period, $P_{DRX}$. During the DRX ON period, the UE switches on its receiver to monitor for downlink traffic and switches off its receiver during the DRX OFF period to save power consumption. The DRX parameters $T_{DRX-ON}$ & $P_{DRX}$ are configured by the network. It should be appreciated by those skilled in the art that such a basic operation may not always be efficient, particularly if a UE frequently does not receive any signals during the ON period (or active operating mode) of the DRX operation.

Figure 5:
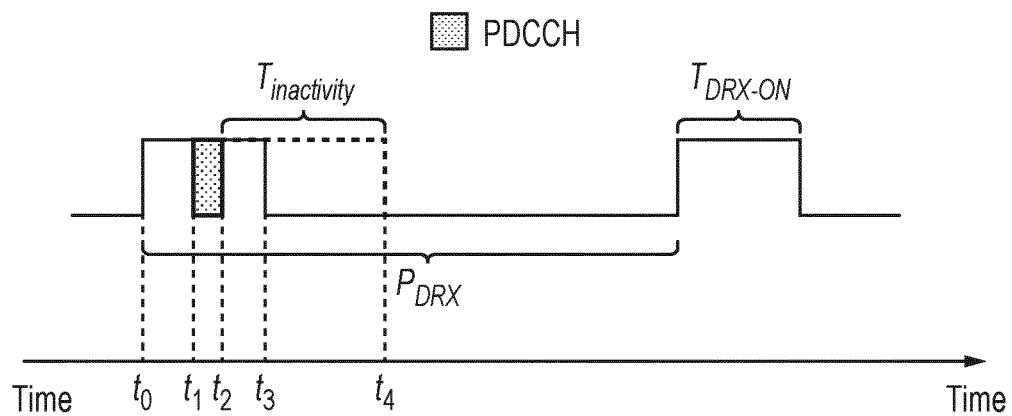
FIG. 5 shows an example of how an inactivity timer may be used during DRX.

If a PDCCH is detected for the UE during the DRX ON period, the UE starts an inactivity timer $T_{Inactivity}$ specifying a period in which the UE will remain awake (i.e. receiver is active) and continues to monitor for further downlink and/or uplink traffic, notably PDCCH. When the inactivity timer expires, the UE moves to the DRX OFF state. An example is shown in FIG. 5, where a PDCCH is detected at time $t_1$ of a DRX ON period, which triggers the inactivity timer which starts at time $t_2$ for a duration of $T_{Inactivity}$. When the timer expires at time $t_4$, the UE switches off its receiver. The inactivity period can extend beyond the DRX ON period; that is, the UE continues to stay awake after the DRX ON period as shown in FIG. 5 where the DRX ON ends at time $t_3$ and the inactivity period continues until time $t_4$. The rationale here is that if the UE receives a data packet, then it is likely it may receive another data packet in the near future and so if the UE receives a data packet towards the end of its DRX ON period, the inactivity timer will keep the UE awake to receive potential further data packets. If the UE receives a packet during the inactivity period, the inactivity timer will reset, i.e. the UE would extend its wake up duration due to the possibility of receiving yet further data packets.

Figure 6:
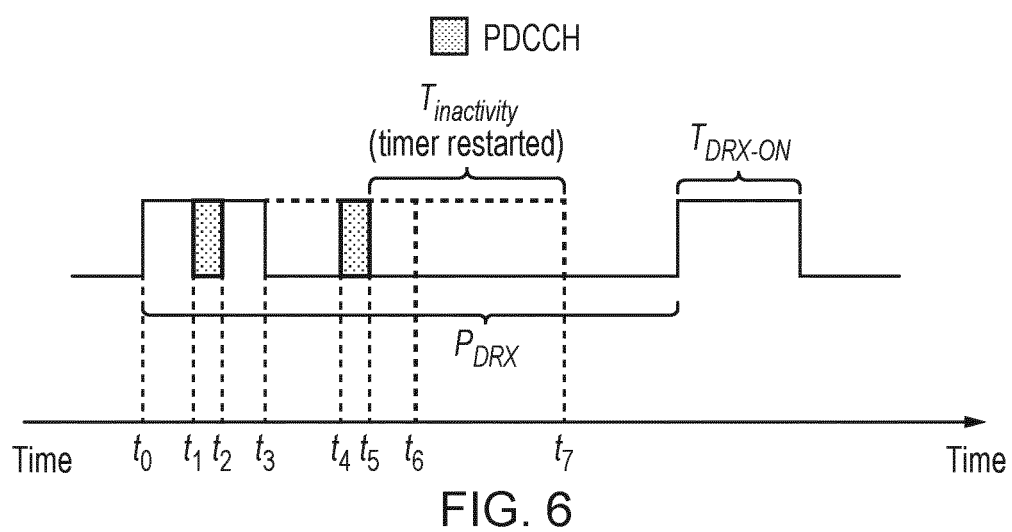
FIG. 6 shows an example of how an inactivity timer may be restarted when a further physical downlink control channel (PDCCH) is detected before the previous inactivity timer expires.

If during the inactivity period, the UE receives a further PDCCH, the inactivity timer is reset, i.e. restarted. It should be noted that the inactivity timer is only restarted here following a single successful decoding of the further PDCCH for a first transmission only; i.e. not when that further PDCCH is a retransmission. An example is shown in FIG. 6, where during a DRX ON period (between time $t_0$ and $t_3$), a PDCCH is detected by the UE at time $t_1$ and so the inactivity timer starts after the PDCCH at time $t_2$ which expires at time $t_6$. During this first inactivity period, another PDCCH is detected at time $t_4$ which then resets the inactivity timer, i.e. the inactivity timer restarts after this PDCCH at time $t_5$ with a duration of $T_{inactivity}$. This follows the same rationale above; that if a data packet is transmitted for a UE then it is likely that another data packet would be transmitted for the same UE in the near future.

The inactivity timer is configured via RRC signaling by the network and can range from 0 ms to 2560 ms. In [3], some DRX parameters and $T_{inactivity}$ values are proposed for evaluation, which represent likely network configurations. Example values in [3] include 10 ms $T_{DRX-ON}$ with 200 ms $T_{inactivity}$, 8 ms $T_{DRX-ON}$ with 100 ms $T_{inactivity}$. It is observed that the inactivity period is typically significantly longer than the DRX ON duration, which would also consume significant battery power.

DRX may be further characterised (as is described in [4]) by an active time, which defines the total duration during which the UE monitors PDCCH, including the on duration DRX ON of the DRX cycle, the time during which the UE is performing continuous reception while the inactivity timer has not expired, and the time during which the UE is performing continuous reception while waiting for a retransmission opportunity. DRX may also be characterised by a retransmission timer, which signifies a duration until a retransmission can be expected. It would be appreciated by those skilled in the art that inactivity timers, on-duration timers, retransmission timers and the link are enumerated in units of subframes in LTE and in units of 1 ms, or sub-millisecond (i.e. 1/32 ms) in NR.

Short DRX Operation

Both NR and LTE support a short DRX mode of operation. The short DRX cycle may be optionally implemented within a long DRX (i.e. standard) cycle and follows the period where the inactivity timer is running. It is controlled by the following parameters:

drx-ShortCycle (optional): the Short DRX cycle; and
drx-ShortCycleTimer (optional): the duration the UE shall follow the Short DRX cycle.

Figure 7:
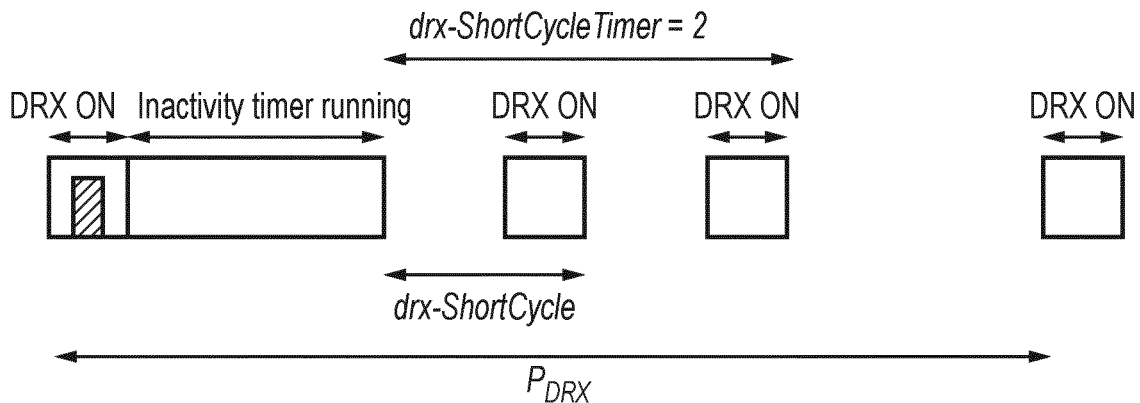
FIG. 7 shows a first example of a short DRX operation.

Operation of short DRX is described in the 3GPP Technical Specification 38.321 [5], in section 5.7. Some of the text herein describing the short DRX operation is reproduced and adapted from [5]. The principle of operation of "short DRX" is that PDCCH is monitored according to a DRX cycle once the inactivity period has expired. This is illustrated in FIG. 7 which shows the following aspects of short DRX operation:

If there has been activity in the initial DRX_ON period (as shown with the hashed box), the inactivity timer is started;

If there is no activity (no PDCCH received) during the running of the inactivity timer, the system enters into short DRX operation;

Short DRX has periods where the UE monitors PDCCH and periods where it doesn't. As can be seen, in the example of FIG. 7, the UE starts short DRX by not monitoring PDCCH;

Every drx-ShortCycle number of subframes, the UE monitors PDCCH for DRX_ON number of subframes. For example, if drx-ShortCycle=16 and DRX_ON=4, the UE monitors PDCCH for 4 subframes out of every 16. The subframes that the UE monitors for PDCCH are known to both the UE and the network;

The UE performs drx-ShortCycleTimer number of short DRX cycles. As can be seen, in the example of FIG. 7, drx-ShortCycleTimer=2;

If there is no activity during the short DRX operation, the UE goes to sleep and wakes up to monitor PDCCH after the end of the long DRX cycle (i.e. after $P_{DRX}$ subframes).

Figure 8:
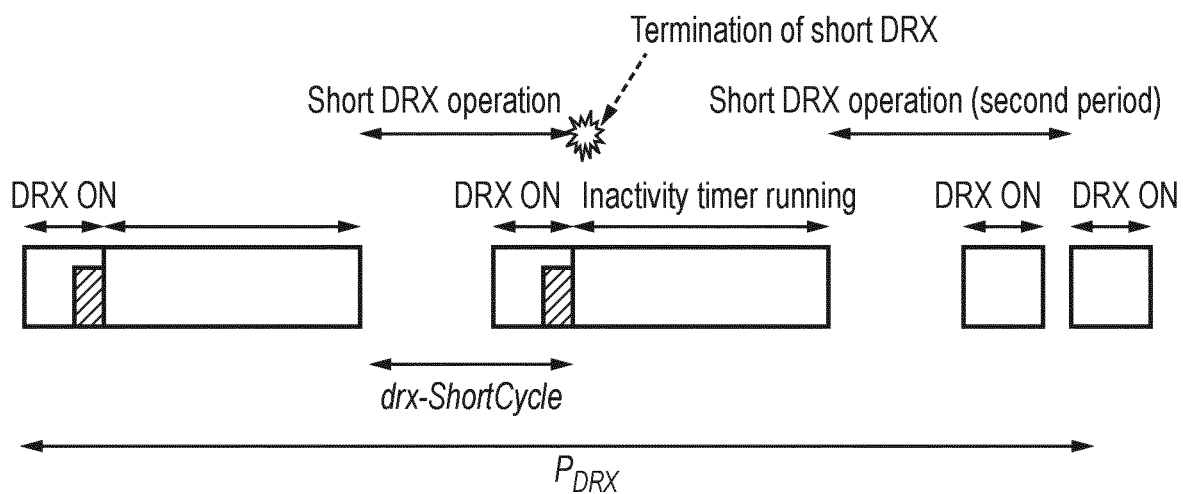
FIG. 8 shows a second example of a short DRX operation where an inactivity timer may be restarted during the initial short DRX operation.

If the UE decodes a PDCCH during one of the DRX_ON durations of the short DRX phase, the UE restarts its inactivity timer (and can then enter a second period of short DRX if there was no PDCCH activity during this second running of the inactivity timer). This operation is shown in FIG. 8. The duration of the inactivity timer and the parameters controlling short-DRX operation are configurable. At the extremes, the network can configure:

Inactivity timer=0: in this case, the UE transitions directly from DRX_ON to short-DRX;

Short-DRX not configured (as described above, short DRX is an optional feature): in this case, following expiry of the inactivity timer, the UE goes into sleep mode until the end of the period $P_{DRX}$ (i.e. until the end of the long DRX cycle).

Device-to-Device (D2D) and Sidelink Communications

Device-to-Device (D2D) communications is an aspect of mobile communications which has been established for devices to communicate directly with each other rather than via a wireless communications network. That is to say that radio signals representing data are transmitted via a wireless interface by one device and received by another to communicate that data, rather than the signals being transmitted to radio infrastructure equipment of a wireless communication network, which are then detected and decoded by the infrastructure equipment to recover that data and communicated on to a destination device.

Figure 9:
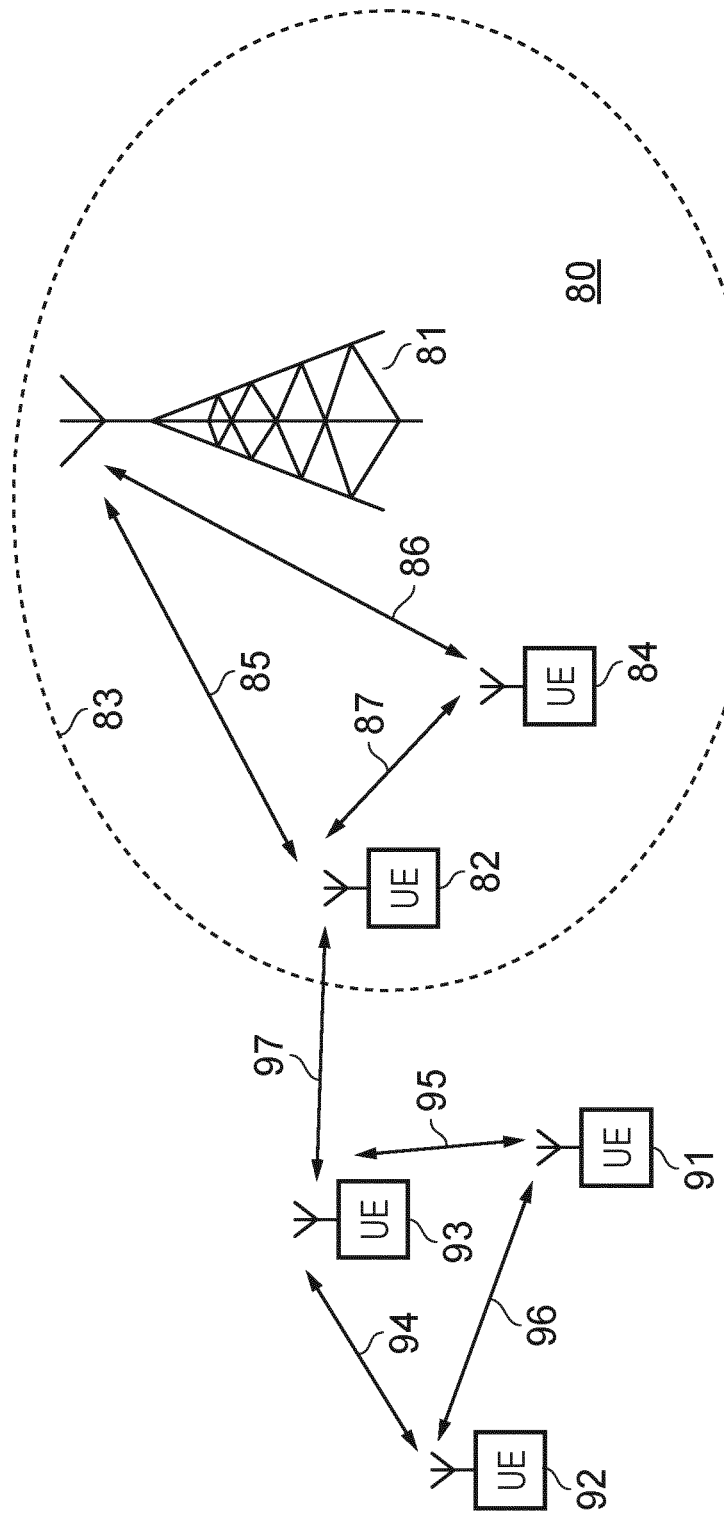
FIG. 9 schematically represents examples of communications devices communicating with each other in accordance with different examples of device-to-device (D2D) communications.

D2D communications can take different forms, which are illustrated in FIG. 9. As shown in FIG. 9, in one example two communications devices (UEs) 82, 84 are operating within a coverage area of a cell 80 provided by radio infrastructure equipment 81, which has a cell boundary 83 represented by a dashed line. The radio infrastructure equipment 81 may for example be a TRP 10 such as that shown in FIG. 2. As represented by dashed lines 85, 86, the UEs 82, 84, may transmit and receive signals to the infrastructure equipment 81 to transmit or to receive data on an uplink or a downlink respectively of a wireless access interface formed by a wireless communications network of which the infrastructure equipment 81 forms part. However within the radio coverage area of the cell 80 the UEs 82, 84 may communicate directly between one another via a D2D wireless access interface as represented by a dashed line 87. The UEs 82, 84 can be configured to transmit and to receive signals via a D2D wireless access interface which may be separate and not shared or overlap a frequency band of the wireless access interface provided by the infrastructure equipment 81. Alternatively the UEs 82, 84 may transmit and receive signals via a part of the wireless access interface provided by the infrastructure equipment 81. A D2D wireless access interface formed for one UE to transmit radio signals to another UE is referred to as a sidelink or PC5.

Another example of D2D communications is also shown in FIG. 9 where UEs fall outside a coverage area of a wireless communication network and so communicate directly with one another. As represented by dashed lines 94, 95, 96, three UEs 91, 92, 93 are operable to transmit and receive signals representing data via sidelinks. These sidelinks 94, 95, 96 may be formed by a D2D wireless access interface which falls within a frequency band of the infrastructure equipment 81 or may be outside this frequency band. However the UEs 91, 92, 93 organise access to a D2D wireless access interface autonomously without reference to a wireless access interface. In some cases, the UEs 91, 92, 93 may be pre-configured with some parameters for a D2D wireless access interface. As another example, one of the UEs 82 within the coverage area of the cell 80 acts as a relay node for one or more of the UEs 91, 92, 93 which are outside the coverage area as represented by a sidelink 97.

Here D2D communications of the form of sidelink 87 are referred to as in-coverage communications, D2D communications of the form of sidelink 97 are referred to as partial coverage communications, and D2D communications of the form of sidelinks 94, 95, 96 are referred to as out-of-coverage communications.

According to 3GPP standards such as LTE, whilst downlink and uplink communications are specified for transmissions from an infrastructure equipment such as a gNB to a UE and from a UE to a gNB respectively, sidelink communications are specified to realise UE-to-UE (device-to-device (D2D)) communication, especially for sidelink discovery, sidelink communication and vehicle to everything (V2X) sidelink communication between UEs. The LTE sidelink has the following characteristics as described below, which are reproduced from [4]:

Sidelink comprises sidelink discovery, sidelink communication, and V2X sidelink communication between UEs;

Sidelink uses uplink resources and a physical channel structure similar to uplink transmissions. However, some changes, noted below, are made to the physical channels;

The sidelink/D2D wireless access interface structure includes a physical sidelink control channel (PSCCH) for UEs to transmit control signaling to other UEs and a physical sidelink shared channel (PSSCH) for transmitting data to other UEs. Control messages transmitted on the PSCCH can indicate communications resources of the PSSCH via which the UE will transmit data to another UE. The control message for sidelink is referred to as sidelink control information (SCI). Therefore the PSCCH is mapped to the sidelink control resources and indicates resource and other transmission parameters used by a UE for PSSCH;

Sidelink transmission uses the same basic transmission scheme as the uplink transmission scheme. However, sidelink is limited to single cluster transmissions for all the sidelink physical channels. Furthermore, sidelink uses a one symbol gap at the end of each sidelink sub-frame. For V2X sidelink communication, PSCCH and PSSCH are transmitted in the same subframe;

The sidelink physical layer processing of transport channels differs from uplink transmission in the following steps:

Scrambling: for PSDCH and PSCCH, the scrambling is not UE-specific; and

Modulation: 256 QAM is not supported for sidelink. 64 QAM is only supported for V2X sidelink communication;

For PSDCH (physical sidelink discovery channel), PSCCH and PSSCH demodulation, reference signals similar to uplink demodulation reference signals are transmitted in the fourth symbol of the slot in normal cyclic prefix (CP) and in the third symbol of the slot in extended cyclic prefix. The sidelink demodulation reference signals sequence length equals the size (number of sub-carriers) of the assigned resource. For V2X sidelink communication, reference signals are transmitted in the third and sixth symbols of the first slot and the second and fifth symbols of the second slot in normal CP;

For PSDCH and PSCCH, reference signals are created based on a fixed base sequence, cyclic shift and orthogonal cover code. For V2X sidelink communication, the cyclic shift for PSCCH is randomly selected in each transmission;

For in-coverage operation, the power spectral density of the sidelink transmissions can be influenced by the eNB; and For measurement on the sidelink, the following basic UE measurement quantities are supported:

Sidelink reference signal received power (S-RSRP);

Sidelink discovery reference signal received power (SD-RSRP);

PSSCH reference signal received power (PSSCH-RSRP); and

Sidelink reference signal strength indicator (S-RSSI).

Currently, for 5G or New Radio (NR) standardisation, a sidelink has been specified in Release-16 for V2X communication, with the LTE sidelink being a starting point for the NR sidelink. For NR sidelink, the following sidelink physical channels are defined:

Physical Sidelink Shared Channel (PSSCH);
Physical Sidelink Broadcast Channel (PSBCH);
Physical Sidelink Control Channel (PSCCH); and
Physical Sidelink Feedback Channel (PSFCH).

Furthermore, the following sidelink physical signals are defined:

Demodulation reference signals (DM-RS);
Channel-state information reference signal (CSI-RS);
Phase-tracking reference signals (PT-RS);
Sidelink primary synchronization signal (S-PSS); and
Sidelink secondary synchronization signal (S-SSS).

NR sidelink can be enhanced with a power saving mechanism for sidelink which would be a useful feature especially for D2D (device-to-device) communications between devices having limited battery power.

A UE is provided by RRC signaling a bandwidth part (BWP) for SL transmissions (SL BWP) and a resource pool. This is typically done by the base station if the UE is in coverage or reachable by a relay node, but for some corner cases where it is known a UE will be or is likely to be out of coverage or reach by a base station, the SL BWP and resource pool may be hardcoded (preconfigured) onto the UE's SIM, for example. The resource pool is configured within the SL BWP. For the resource pool, the UE is provided a number of sub-channels where each sub-channel includes a number of contiguous physical resource blocks (PRBs). The sub-channel is defined as the minimum granularity in the frequency domain for transmission and reception of sidelink in the unit of PRB. The first PRB of the first sub-channel in the SL BWP is indicated. Hence the UE only needs to monitor those sub-channels that have been indicated, reducing the search space and number of blind decodes necessary at the UE. A slot is the time-domain granularity for a resource pool. Available slots for a resource pool are provided by RRC signaling and occur with a periodicity. For each periodicity, the RRC signaling may be bitmap signaling or indication of starting slot and length. A UE may be configured with an Rx (reception) resource pool and a Tx (transmission) resource pool separately. The Rx resource pool may be used for PSCCH monitoring at a Rx UE. Here, those skilled in the art would appreciate that a BWP (which is well known in the art as a power saving scheme for a UE) is a part of a carrier bandwidth providing a number of contiguous physical resource blocks (PRBs) which can be grouped to form a BWP in NR. Multiple BWPs can exist within a carrier bandwidth, but only one BWP is activated per UE at a given time.

Figure 10:
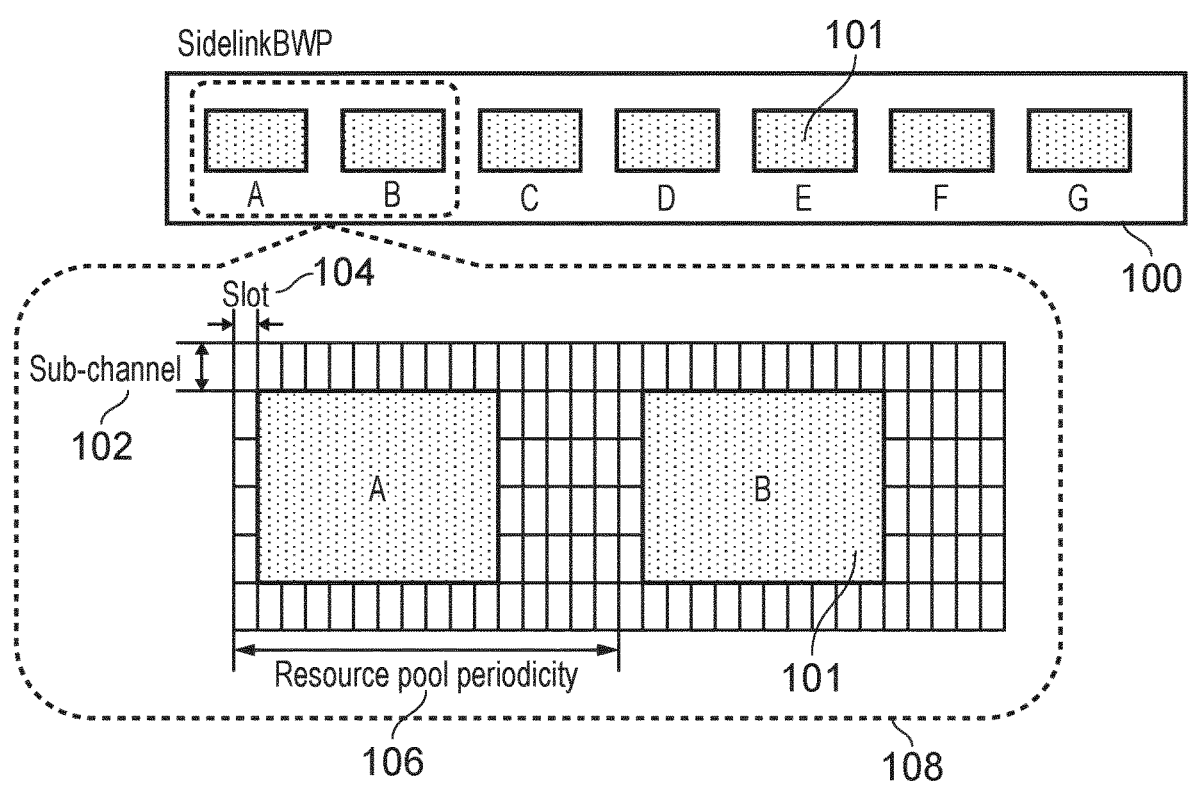
FIG. 10 shows an example of resource pool configuration for sidelink communications.

FIG. 10 shows an example of resource pool configuration in a sidelink BWP 100. Each instance of the resource pool 101 (labeled A to G) consists of four sub-channels 102 and ten slots 104 starting from the second slot of the resource pool periodicity, where the resource pool periodicity 106 is sixteen slots; i.e. the start of each instance of the resource pool 101 is sixteen slots from the start of the previous resource pool instance. Sidelink BWP portion 108 is a zoomed in portion of overall sidelink BWP 100, showing more clearly how two resource pool instances 101 (A and B) are made up from four sub-channels 102 and ten slots 104, with the periodicity 106 of sixteen slots being clearly seen. It should be noted that each instance of the resource pool within the periodicity may consist of non-contiguous slots in the time domain.

NR sidelink supports broadcast, groupcast and unicast (i.e. three "cast types" are supported). For SL broadcast, a UE transmits data to unspecified UEs which are close to the transmitter UE. The SL broadcast may be suitable for alert indication. For SL unicast, a UE transmits data to a specified UE. To realise the unicast transmission, SCI (sidelink control information) includes a destination ID (i.e. identifier of a receiver UE) and a source ID (i.e. identifier of a transmitter UE). For SL groupcast, a UE transmits data to one or more specified UEs within the same group. SL groupcast may be suitable for a platooning application which is a method for driving a group of vehicles together. To realise the groupcast transmission, SCI includes a destination group ID (i.e. identifier of a group to be received) and a source ID.

The UE needs to be able to save power in V2X. This is particularly relevant to pedestrian UEs, as these are typically connected to far smaller batteries than UEs which are implemented in vehicles. In sidelink communications, the UE monitors for activity at a resource-pool granularity and not at a subframe-level granularity (herein, for NR, the term "subframe-level granularity" can mean either "at the granularity of every 1 ms" or "at the granularity of every $\frac{1}{32}$ ms"). The Release-16 DRX-based power-saving mechanisms are thus not applicable for sidelink due to the mismatch between the resource-pool granularity and the subframe-level granularity. For example, with reference to FIG. 10, there are some subframes in the NR frame structure that are not part of the resource pools; resource pools A to G do not occupy the entirety of the sidelink BWP 100. It would be inappropriate for the UE to monitor PSCCH in subframes that are not contained within resource pools. Embodiments of the present technique seek to overcome these issues, enabling enhanced power saving by a UE in V2X.

Resource Pool Based DRX Cycles for Sidelink Communications

Figure 11:
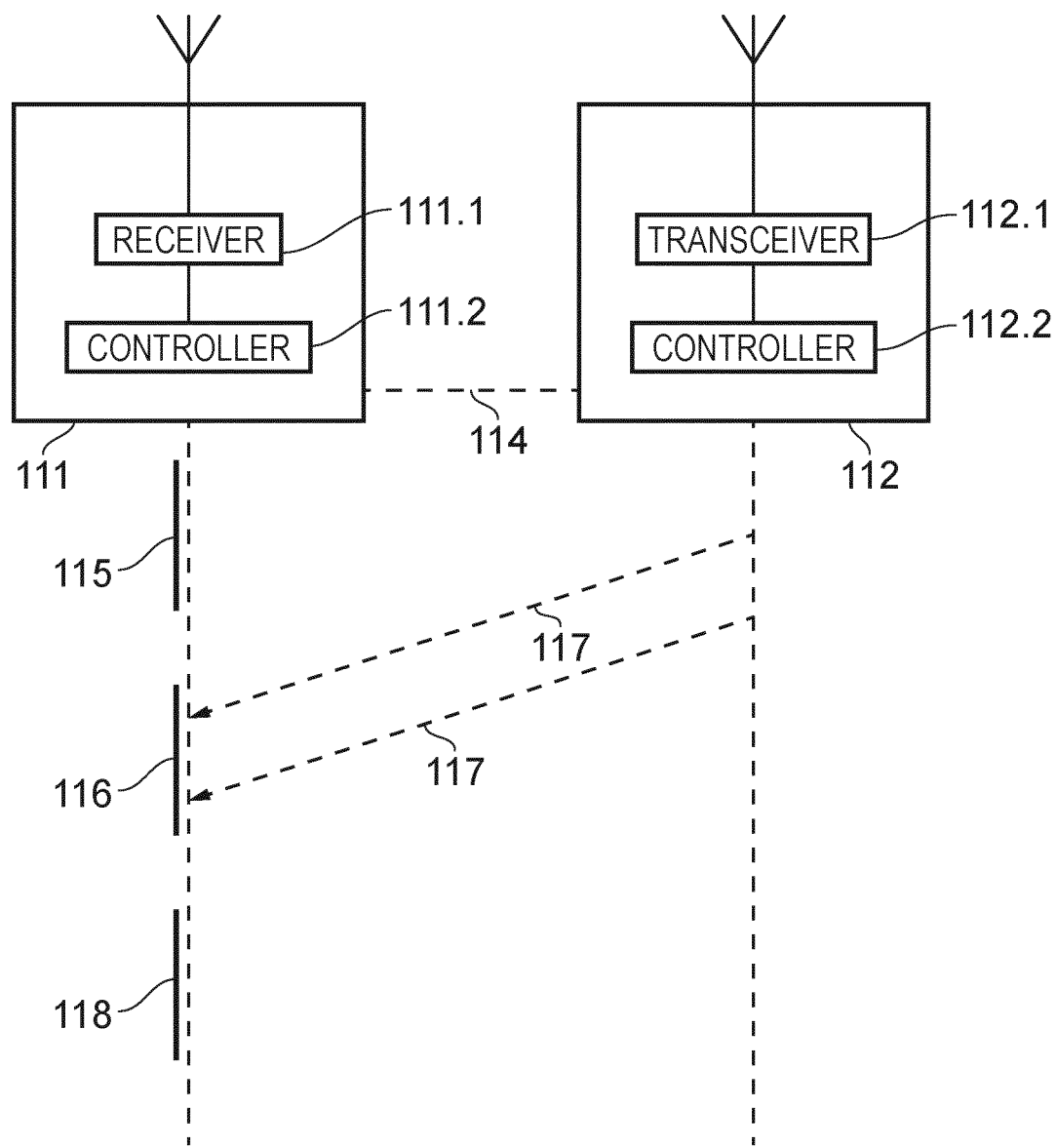
FIG. 11 shows a schematic representation of a wireless communications network comprising a communications device and an infrastructure equipment in accordance with embodiments of the present technique.

FIG. 11 shows a schematic representation of a wireless communications system comprising a plurality of communications devices 111, 112 in accordance with embodiments of the present technique. The communications devices 111, 112 each comprise a controller (or controller circuitry) 111.2, 112.2, which may be, for example, a microprocessor(s), a CPU(s), a chip(s), or a dedicated chipset(s), etc.

The communications device 111 (which is a receiving communications device) comprises a receiver (or receiver circuitry) 111.1 configured to receive signals from one or more other communications devices within sidelink communications resources of a plurality of resource pool instances of a sidelink interface 114, each of the resource pool instances being arranged in time (e.g. each of the resource pool instances could be temporally discrete i.e. each resource pool instance is separate in time from the others of the resource pool instances, or could share common borders with no gaps in between, or could at least partially overlap each other) in accordance with a resource pool periodicity (i.e. the frequency of occurrence of each of the resource pool instances, defining when they start with respect to the start of the previous resource pool instance). It should be appreciated by those skilled in the art that this receiver 111.1 may be a standalone receiver, or may form part of a transceiver (or transceiver circuitry, which is not shown in FIG. 11) capable of transmitting and receiving signals. The communications device 111 may also comprise a separate transmitter (not shown in FIG. 11). Similarly, the other communications device 112 (which may be one of a plurality of other communications devices 112 to the communications device 111) may comprise a transceiver (or transceiver circuitry) 112.1, which is configured to transmit or receive signals to or from the communications device 111 or other communications devices 112 via the sidelink interface 114. This transceiver 112.1 may also be formed of separate transmitter and receiver elements/circuitry (not shown in FIG. 11).

In embodiments of the present technique, the receiver circuitry 111.1 and the controller circuitry 111.2 of the communications device 111 are configured in combination to switch 115 at a first periodic rate between a primary active operating mode and a primary reduced power operating mode in accordance with a primary discontinuous reception, DRX, operation (i.e. long DRX), to monitor 116 for signals 117 transmitted by the other communications devices 112 to the communications device 111 in one or more of the resource pool instances during the primary active operating mode (of course, it would be appreciated that such signals 117 are not always transmitted by the other communications device(s) 112 or received by the communications device 111 in each instance of the primary active operating mode), and to stop monitoring 118 for signals transmitted by the other communications devices to the receiving communications device in one or more of the resource pool instances during the primary reduced power operating mode. The first periodic rate is dependent on the resource pool periodicity. Here, it should be noted that the "first periodic rate" refers to the DRX period of the long DRX cycle (i.e. the primary DRX operation), and is analogous to $P_{DRX}$ of FIG. 4, for example. For example, in some arrangements of embodiments of the present technique, the first periodic rate may be an integer multiple of the resource pool periodicity.

Essentially, embodiments of the present technique propose that DRX operation be applied at the resource pool level for sidelink communications. Embodiments of the present technique therefore allow for the following features of DRX operation to be supported:

Long DRX;
Inactivity timer; and
Short DRX.

The following description of arrangements of embodiments of the present technique provides detail on how such features of DRX operation may be supported for sidelink communications.

Basic Resource Pool Level DRX Functionality

Figure 12:
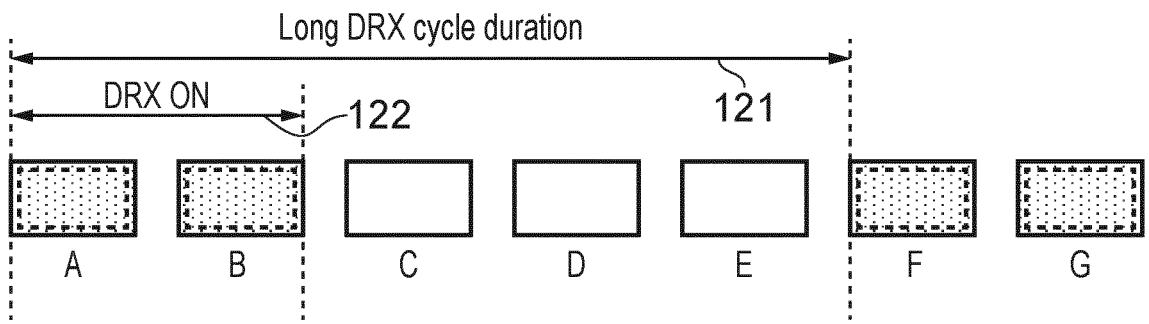
FIG. 12 illustrates a first example of long sidelink DRX functionality, where the target UE doesn't receive any PSCCHs in accordance with embodiments of the present technique.

Functionality of a basic embodiment of the invention is shown in FIG. 12. FIG. 12 shows a UE operating according to sidelink DRX functionality, where there is no data sent to the UE. In FIG. 12, there are seven instances of a resource pool that the UE is configured to monitor (the instances are labeled 'A' to 'G'). The following functionality applies, during each of the instances of the resource pool A to G:

A: The UE has been configured with a long DRX cycle duration 121 and DRX_ON 122 duration (broadly equivalent to the primary active operating mode as used herein). The UE may be required to switch between the primary active operating mode and the primary reduced power operating mode at the start of a resource pool instance. Alternatively, and as is shown in FIG. 12, the UE may be required to wake up when a modulo operation performed between the resource pool index (in an example, the resource pool index increments at each instance of the resource pool and the initial resource pool index can be signaled to the UE when the sidelink is configured) and the long DRX cycle duration 121 is equal to an offset value (i.e. does (resource pool index)MOD(long DRX duration)=offset value?). It will be appreciated by those skilled in the art that the use of a modulo operation is just one example of a function relating the resource pool index and the long DRX cycle duration and that other functions could be used to determine when the UE should transition to an awake state. In other words, each of the resource pool instances is associated with an index value, and wherein the receiving communications device is configured to switch between the primary reduced power operating mode and the primary active operating mode at the start of a resource pool instance when a result of a function of the index value of the resource pool instance and a period defined by the first periodic rate is equal to a specified value (in the example of FIG. 12 the period defined by the first periodic rate is equivalent to five resource pools). Here, and as is the case in the example of FIG. 12, the function may be a modulo function/operation. In FIG. 12, this criterion is met for resource pool instance A;

A, B: The UE monitors both resource pool instance A and resource pool instance B, since the DRX_ON 122 duration in this example is equal to two resource pools. The UE monitors the entire resource pool (potentially spanning multiples frequencies and multiple timeslots), but the UE does not receive a PSCCH for the UE during either of these resource pool instances. In other words, the receiving communications device is configured to enter the primary reduced power operating mode in accordance with the first periodic rate if no signals from the other communications devices have been received during a current instance of the primary active operating mode. The extent of the resource pool instance that is monitored is indicated by the dotted lines in each resource pool instance;

C, D, E: Since the UE has not received a PSCCH in a resource pool that occurs during the DRX_ON duration, the UE goes to sleep for the duration of resource pool instances C, D, E (i.e. until the end of the next long DRX cycle duration 121). In other words, the receiving communications device is configured to switch from the primary active operating mode to the primary reduced power operating mode at the start of a first resource pool instance after the end of a current active period (of the primary active operating mode), where the switching rate between the primary active operating mode and the primary reduced power operating mode is defined by the first periodic rate (in the example of FIG. 12 the period defined by the first periodic rate is equivalent to five resource pool instances, with the active period, which refers to the DRX_ON period, being equivalent to two resource pool instances). This duration of resource pool instances C, D, E during which the UE goes to sleep can also be called DRX_OFF (and this is broadly equivalent to the primary reduced power operating mode as used herein); and F, G: As for resource pool instance A, the UE wakes up and monitors resource pool instances F and G since the result of the modulo operation between the resource pool index and the long DRX cycle duration 121 is equal to an offset value.

A skilled artisan will appreciate that while the UE may be required to switch between the primary active operating mode and the primary reduced power operating mode at the start of a resource pool instance, it may also switch to a reduced power operating mode for other reasons. For example, in periods between resource pool instances when these resource pool instances are temporally discrete, the UE may also switch to a reduced power operating mode, since there is no resource for the UE to monitor. In other words, here, the UE may switch to the primary reduced power operating mode at the end of the final resource pool instance in which it was in the primary active operating mode, rather than at the start of the first resource pool instance in which it is in the primary reduced power operating mode. It will be further appreciated that the requirement to switch between the primary active operating mode and the primary reduced power operating mode may be a soft requirement, which in effect allows the UE to operate in the primary reduced power operating mode, rather than mandating certain UE power consumption functionality or design targets. For example, the UE may determine that it is allowed to switch to the primary reduced power operating mode, but decides to make a measurement, and so remains in the primary active operating mode in order to make the measurement.

Sidelink DRX Operation with an Inactivity Timer

Figure 13:
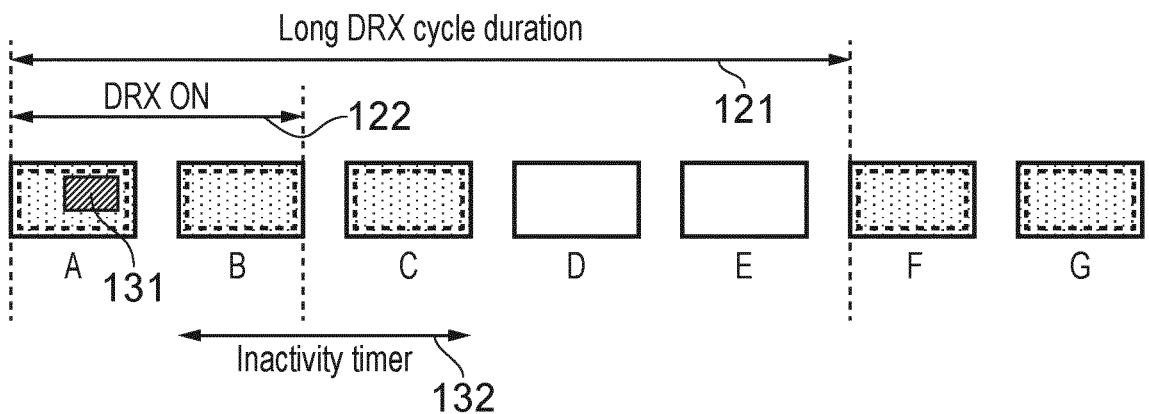
FIG. 13 illustrates a second example of long sidelink DRX functionality, where the target UE does receive a PSCCH and an inactivity timer is started in accordance with embodiments of the present technique.

FIG. 13 shows the long DRX cycle 121 functionality when the UE receives a PSCCH 131 in a resource pool during the DRX_ON 122 duration. In this case, an inactivity timer 132 is started and the UE monitors for further PSCCHs in resource pool instances during the running of the inactivity timer 132 (i.e. during an inactivity period), during which the UE does not enter DRX_OFF. In other words, the receiving communications device is configured to start, during a current instance of the primary active operating mode upon receiving a first signal from one of the other communications devices, an inactivity timer specifying an inactivity period comprising one or more resource pool instances (following the resource pool instance in which the PSCCH is received) during which the receiving communications device does not switch into the primary reduced power operating mode. Functionality in the different instances of the resource pools in the example of FIG. 13 is described below:

A: As for the example illustrated by FIG. 12, the UE wakes up and monitors the resource pool according to a known DRX-related criterion (e.g. resource pool ID MOD long DRX cycle duration=offset);

A: The UE receives a PSCCH 131 and hence starts an inactivity timer 132. The inactivity timer 132 runs for two subsequent instances of the resource pool according to this example shown in FIG. 13. It should be noted that the length of the inactivity timer 132 (and other sidelink DRX-related parameters) could be configured by RRC signaling, or could be pre-provisioned (e.g. via a SIM card). In other words, the receiving communications device is configured to receive an indication of the inactivity period via Radio Resource Control, RRC, signaling from a mobile communications network, or alternatively, the inactivity period is predetermined and known to the receiving communications device;

B, C: Since the inactivity timer 132 is running, the UE monitors instances of the resource pool B and C. In other words, the receiving communications device is configured to monitor for further signals transmitted by one of the other communications devices (in some examples the receiving communications device could monitor for further signals from any of the other communications devices) to the receiving communications device in the one or more resource pool instances during the inactivity period. In the example of FIG. 13, the UE does not receive a further PSCCH;

D, E: Since the UE has not received a further PSCCH during the running of the inactivity timer 132, it goes to sleep for the instances of the resource pool labeled D and E. In other words, the receiving communications device is configured to enter the primary reduced power operating mode if no further signals from one of the other communications devices (or indeed any of the other communications devices) have been received during the inactivity period; and F, G: As per the example of FIG. 12, the UE wakes up for instances of resource pool F and G due to the criterion for waking up and the long DRX cycle duration 121— that the resource pool index MOD long DRX cycle duration is equal to an offset value.

Sidelink DRX Operation with Short DRX Functionality

Figure 14:
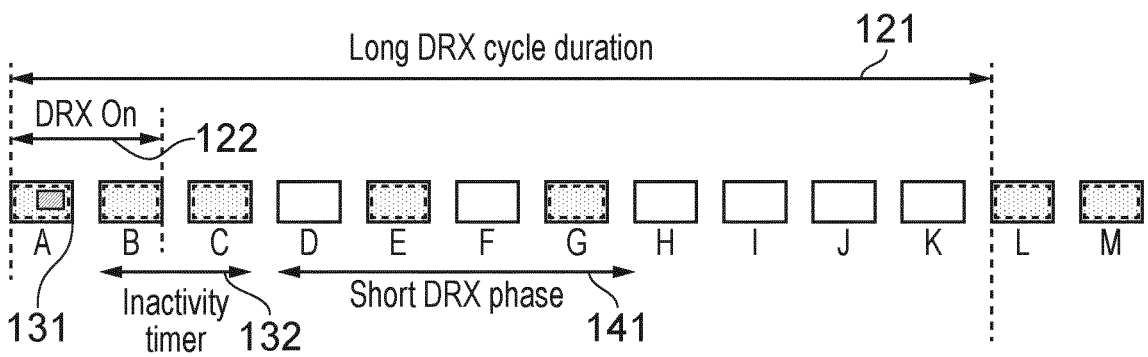
FIG. 14 illustrates an example of long DRX and short DRX functionality for sidelink communications in accordance with embodiments of the present technique.

FIG. 14 shows long DRX 121 and short DRX 141 functionality applied to the sidelink at the resource pool level; i.e. short DRX 141 functionality is applied to the example of FIG. 13. Due to PSCCH 131 activity during the DRX_ON 122 phase of the long DRX cycle 121, the inactivity timer 132 runs for the duration of resource pool instances B and C. Once the inactivity timer 132 expires, due to there being no PSCCH during the running of the inactivity timer, the UE enters a short DRX phase 141, whereby the UE monitors some instances of the resource pool and does not monitor other instances. After the short DRX phase 141, the UE goes to sleep until the DRX_ON 122 phase at the start of the next long DRX cycle 121. The functionality in the various instances of the resource pool are described below:

A: As for the example illustrated by FIG. 12, the UE wakes up and monitors the resource pool according to a known DRX-related criterion (resource pool ID MOD long DRX cycle duration=offset value);

A: The UE receives a PSCCH 131 and hence starts an inactivity timer 132. The inactivity timer 132 runs for two subsequent instances of the resource pool according to this example shown in FIG. 14. It should be noted, in the same way as described with respect to the example shown by FIG. 13, that the length of the inactivity timer 132 (and other sidelink DRX-related parameters) could be configured by RRC signaling, or could be pre-provisioned (e.g. via a SIM card);

B, C: The inactivity timer 132 is running (in this example it is assumed that the inactivity timer has been configured to run for two instances of the resource pool), hence the UE monitors these instances of the resource pool;

D: Once the inactivity timer 132 expires, the UE enters a short DRX phase 141. In this example, short DRX is configured to cause the UE to wake up for two instances of the resource pool and to sleep for two instances (according to the pattern shown in FIG. 14) although those skilled in the art would understand that any conceivable short DRX pattern (e.g. one instance awake, one instance asleep, etc. or awake for 50% of the instances for a first period and awake for 25% of the instances for a subsequent period—such further short DRX operations are briefly discussed in more detail below) are within the scope of embodiments of the present technique. In other words, the receiving communications device is configured, following the end of the inactivity period, to switch at least at a second periodic rate, between a secondary active operating mode and a secondary reduced power operating mode in accordance with a secondary DRX operation for the duration of a secondary DRX operation period, the second periodic rate being higher than the first periodic rate. Here, the "second periodic rate" refers to the DRX period of the short DRX cycle (i.e. the secondary DRX operation). Similarly to the inactivity timer, this secondary (i.e. short) DRX operation period could be configured by RRC signaling, or could be pre-provisioned (e.g. via a SIM card). The duration of the secondary DRX operation period could be determined by the UE based on other parameters, such as the number of wake instances, number of sleep instances and the durations of the sleep/wake instances—for example, by multiplying the number of wake instances by the duration of the wake instances, and adding this to the product of number of sleep instances and the duration of the sleep instances;

E: Short DRX operation 141 is running and the UE wakes up for this instance of the resource pool and monitors for received further PSCCHs. Although this behaviour is not shown in FIG. 14, if further PSCCHs are received, then the UE will restart the inactivity timer; in other words, the receiving communications device is configured to determine if further signals from one of the other communications devices have been received during the secondary DRX operation, and if further signals from one of the other communications devices (or indeed any of the other communications devices) have been received, to restart the inactivity timer 132 and the inactivity period, thus leaving the short DRX phase 141 and the UE would thus restart its behaviour as in resource pool instance A where the inactivity timer 132 was first started. However, in the example of FIG. 14, the UE does not receive a further PSCCH, and hence goes back to sleep;

F: UE sleeps during this instance of the resource pool during the short DRX mode 141 of operation;

G: Short DRX operation 141 is running and the UE wakes up for this instance of the resource pool and monitors for received further PSCCHs. The UE does not receive a further PSCCH. Since this is the end of the short DRX mode of operation 141 and the UE has not received a further PSCCH, it ends the short DRX mode of operation 141 (and since the inactivity timer 132 has also expired, the UE will wake up according to the long DRX cycle operation 121);

H, I, J, K: UE sleeps between the end of short DRX operation 141 and the start of the next long DRX cycle 121; and L, M: UE wakes up during DRX_ON period 122 of the next long DRX cycle 121, according to the criterion for waking up during long DRX operation (as described above with respect to FIGS. 12 and 13).

As described above, operation of the UE during the short DRX phase 141 could be in accordance with one or more of a plurality of different implementations. The secondary DRX operation may comprise a plurality of phases, each of the phases having a different value of at least one DRX parameter. This parameter may comprise a proportion of the secondary DRX operation during which the receiving communications device is in the secondary active operating mode, or may comprise a number of resource pool instances during which the receiving communications device is in each instance of the second active operating mode during the secondary DRX operation. In at least some implementations, there may be a gap of one or more resource pool instances between two of the plurality of phases of the secondary DRX operation during which the receiving communications device is in the secondary reduced power operating mode. In at least some implementations, the proportion of the secondary DRX operation during which the receiving communications device is in the secondary active operating mode is highest in a first of the plurality of phases and decreases over time such that the proportion of the secondary DRX operation during which the receiving communications device is in the secondary active operating mode is lowest in a last of the plurality of phases.

Embodiments of the present technique also provide a transmitting UE that knows the DRX operation of the receiving UE, for example because the transmitting UE indicates to the receiving UE how it should behave in terms of its DRX operation, or the transmitting UE receives signaling information from the receiver UE or otherwise detects signaling information transmitted from or to the receiver UE which indicates the receiver UE's DRX operation. The transmitter UE is then able to transmit signals to the receiver UE in accordance with its DRX operation; i.e. when the receiver UE is awake and actively monitoring for signals. In other words, such embodiments of the present technique can provide a transmitting communications device comprising a transmitter configured to transmit signals to one or more other communications devices within sidelink communications resources of a plurality of resource pool instances of a sidelink interface, each of the resource pool instances being arranged in time in accordance with a resource pool periodicity, and a controller configured in combination with the transmitter to determine that a receiving communications device of the other communications devices is operating in accordance with a primary discontinuous reception, DRX, operation in which the receiving communications device switches at a first periodic rate between a primary active operating mode in which the receiving communications device will monitor for the signals transmitted by the transmitting communications device in one or more of the resource pool instances and a primary reduced power operating mode in which the receiving communications device will stop monitoring for signals transmitted by the transmitting communications device in one or more of the resource pool instances, and to transmit signals to the receiving communications device in accordance with the primary DRX operation, wherein the first periodic rate is dependent on the resource pool periodicity.

In at least some arrangements of embodiments of the present technique, one or more of the first periodic rate and primary DRX operation (i.e. the long DRX cycle), the second periodic rate and secondary DRX operation (i.e. the short DRX phase), the inactivity timer and inactivity period, and the specified value (the offset value for comparing to the resource pool ID MOD long DRX cycle duration calculation as described above) may be signaled to the receiving communications device by at least one of the other communications devices (i.e. a transmitting communications device/signaling communications device). Furthermore, in at least some of these arrangements, the signaling communications device may actually decide itself what these DRX parameters should be for the receiving communications device, whilst in other arrangements, the signaling communications device may simply relay the DRX parameters to the receiving communications device having been itself signaled such DRX parameters by the network or by another of the communications devices.

It should be appreciated by those skilled in the art that, where signaling or signals have been referred to herein as being received from a mobile communications network, such signaling/signals may be from the core network or radio access network, and may be transmitted to the UE by a gNB/base station or by a relay node between the UE and the gNB/base station.

Flow Chart Representation

Figure 15:
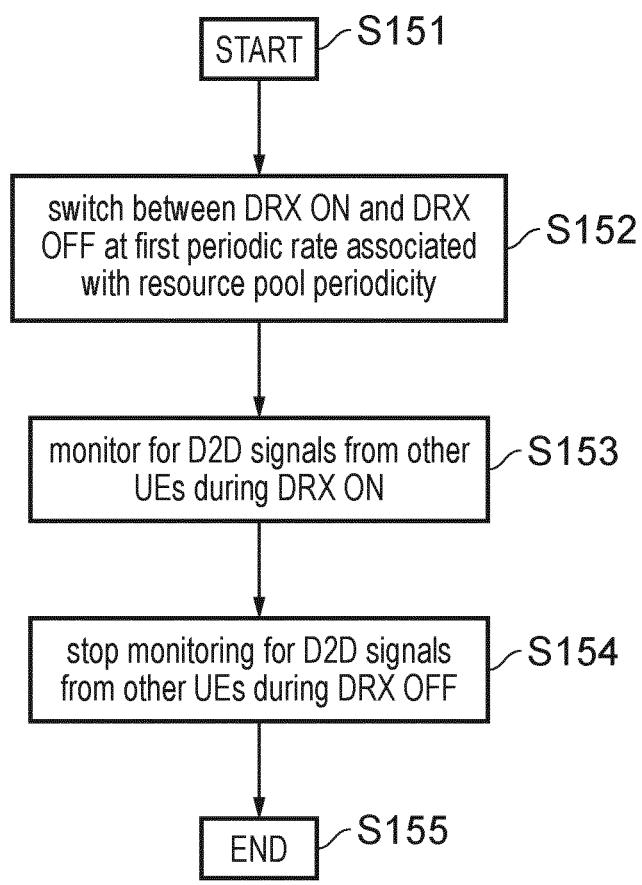
FIG. 15 is a flow diagram representation of a method of operating a communications device according to embodiments of the present technique.

FIG. 15 shows a flow diagram illustrating a method of operating a communications device according to embodiments of the present technique. The communications device (which is a receiving communications device) is configured to receive signals from one or more other communications devices within sidelink communications resources of a plurality of resource pool instances of a sidelink interface, each of the resource pool instances being arranged in time in accordance with a resource pool periodicity.

The method begins in step S151. The method comprises, in step S152, switching at a first periodic rate between a primary active operating mode and a primary reduced power operating mode in accordance with a primary discontinuous reception, DRX, operation. In step S153, the method comprises monitoring for signals transmitted by the other communications devices to the receiving communications device in one or more of the resource pool instances during the primary active operating mode. In step S154, the process comprises stopping the monitoring for signals transmitted by the other communications devices to the receiving communications device in one or more of the resource pool instances during the primary reduced power operating mode. Here, the first periodic rate is dependent on the resource pool periodicity. The process ends in step S155.

Those skilled in the art would appreciate that the method shown by FIG. 15 may be adapted in accordance with embodiments of the present technique. For example, other intermediate steps may be included in the method, or the steps may be performed in any logical order. Though embodiments of the present technique have been described largely by way of the example communications system shown in FIG. 11, and in accordance with the arrangements shown in FIGS. 12 to 14, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A receiving communications device comprising
a receiver configured to receive signals from one or more other communications devices within sidelink communications resources of a plurality of resource pool instances of a sidelink interface, each of the resource pool instances being arranged in time in accordance with a resource pool periodicity, and
a controller configured in combination with the receiver
to switch at a first periodic rate between a primary active operating mode and a primary reduced power operating mode in accordance with a primary discontinuous reception, DRX, operation,
to monitor for signals transmitted by the other communications devices to the receiving communications device in one or more of the resource pool instances during the primary active operating mode, and
to stop monitoring for signals transmitted by the other communications devices to the receiving communications device in one or more of the resource pool instances during the primary reduced power operating mode,
wherein the first periodic rate is dependent on the resource pool periodicity.

Paragraph 2. A receiving communications device according to Paragraph 1, wherein the first periodic rate is an integer multiple of the resource pool periodicity.

Paragraph 3. A receiving communications device according to Paragraph 1 or Paragraph 2, wherein the receiving communications device is configured to switch between the primary reduced power operating mode and the primary active operating mode at the start of a resource pool instance.

Paragraph 4. A receiving communications device according to any of Paragraphs 1 to 3, wherein each of the resource pool instances is associated with an index value, and wherein the receiving communications device is configured to switch between the primary reduced power operating mode and the primary active operating mode at the start of a resource pool instance when a result of a function of the index value of the resource pool instance and a period defined by the first periodic rate is equal to a specified value.

Paragraph 5. A receiving communications device according to Paragraph 4, wherein the function is a modulo function.

Paragraph 6. A receiving communications device according to Paragraph 4 or Paragraph 5, wherein the receiving communications device is configured to receive an indication of the specified value via signaling from one of the other communications devices or from a mobile communications network.

Paragraph 7. A receiving communications device according to any of Paragraphs 1 to 6, wherein the receiving communications device is configured to switch from the primary active operating mode to the primary reduced power operating mode at the start of a first resource pool instance after the end of a current active period of the primary active operating mode, wherein the switching rate between the primary active operating mode and the primary reduced power operating mode is defined by the first periodic rate.

Paragraph 8. A receiving communications device according to any of Paragraphs 1 to 7, wherein the receiving communications device is configured to enter the primary reduced power operating mode in accordance with the first periodic rate if no signals from the other communications devices have been received during a current instance of the primary active operating mode.

Paragraph 9. A receiving communications device according to any of Paragraphs 1 to 8, wherein the receiving communications device is configured to receive an indication of at least one parameter of the primary DRX operation and the first periodic rate via signaling from one of the other communications devices or from a mobile communications network.

Paragraph 10. A receiving communications device according to any of Paragraphs 1 to 9, wherein the controller is configured in combination with the receiver
to start, during a current instance of the primary active operating mode upon receiving a first signal from one of the other communications devices, an inactivity timer specifying an inactivity period comprising one or more resource pool instances during which the receiving communications device does not switch into the primary reduced power operating mode.

Paragraph 11. A receiving communications device according to Paragraph 10, wherein the receiving communications device is configured to receive an indication of the inactivity period via Radio Resource Control, RRC, signaling from a mobile communications network.

Paragraph 12. A receiving communications device according to Paragraph 10 or Paragraph 11, wherein the inactivity period is predetermined and known to the receiving communications device.

Paragraph 13. A receiving communications device according to any of Paragraphs 10 to 12, wherein the receiving communications device is configured to receive an indication of the inactivity period via signaling from one of the other communications devices or from a mobile communications network.

Paragraph 14. A receiving communications device according to any of Paragraphs 10 to 13, wherein the receiving communications device is configured to monitor for further signals transmitted by one of the other communications devices to the receiving communications device in the one or more resource pool instances during the inactivity period.

Paragraph 15. A receiving communications device according to any of Paragraphs 10 to 14, wherein the receiving communications device is configured to enter the primary reduced power operating mode if no further signals from one of the other communications devices have been received during the inactivity period.

Paragraph 16. A receiving communications device according to any of Paragraphs 10 to 15, wherein the receiving communications device is configured, following the end of the inactivity period, to switch at least at a second periodic rate, between a secondary active operating mode and a secondary reduced power operating mode in accordance with a secondary DRX operation for the duration of a secondary DRX operation period, the second periodic rate being higher than the first periodic rate.

Paragraph 17. A receiving communications device according to Paragraph 16, wherein the receiving communications device is configured to receive an indication of at least one parameter of the secondary DRX operation and the second periodic rate via signaling from one of the other communications devices or from a mobile communications network.

Paragraph 18. A receiving communications device according to Paragraph 16 or Paragraph 17, wherein the secondary DRX operation comprises a plurality of phases, each of the phases having a different value of at least one DRX parameter.

Paragraph 19. A receiving communications device according to any of Paragraphs 16 to 18, wherein the at least one DRX parameter comprises a proportion of the secondary DRX operation during which the receiving communications device is in the secondary active operating mode.

Paragraph 20. A receiving communications device according to any of Paragraphs 16 to 19, wherein the at least one DRX parameter comprises a number of resource pool instances during which the receiving communications device is in each instance of the second active operating mode during the secondary DRX operation.

Paragraph 21. A receiving communications device according to any of Paragraphs 16 to 20, wherein there is a gap of one or more resource pool instances between two of the plurality of phases of the secondary DRX operation during which the receiving communications device is in the secondary reduced power operating mode.

Paragraph 22. A receiving communications device according to any of Paragraphs 16 to 21, wherein the proportion of the secondary DRX operation during which the receiving communications device is in the secondary active operating mode is highest in a first of the plurality of phases and decreases over time such that the proportion of the secondary DRX operation during which the receiving communications device is in the secondary active operating mode is lowest in a last of the plurality of phases.

Paragraph 23. A receiving communications device according to any of Paragraphs 16 to 22, wherein the receiving communications device is configured
to determine if further signals from one of the other communications devices have been received during the secondary DRX operation, and
if further signals from one of the other communications devices have been received, to restart the inactivity timer and the inactivity period.

Paragraph 24. A method of operating a receiving communications device configured to receive signals from one or more other communications devices within sidelink communications resources of a plurality of resource pool instances of a sidelink interface, each of the resource pool instances being arranged in time in accordance with a resource pool periodicity, the method comprising switching at a first periodic rate between a primary active operating mode and a primary reduced power operating mode in accordance with a primary discontinuous reception, DRX, operation, monitoring for signals transmitted by the other communications devices to the receiving communications device in one or more of the resource pool instances during the primary active operating mode, and stopping monitoring for signals transmitted by the other communications devices to the receiving communications device in one or more of the resource pool instances during the primary reduced power operating mode, wherein the first periodic rate is dependent on the resource pool periodicity.

Paragraph 25. Circuitry for a receiving communications device comprising receiver circuitry configured to receive signals from one or more other communications devices within sidelink communications resources of a plurality of resource pool instances of a sidelink interface, each of the resource pool instances being arranged in time in accordance with a resource pool periodicity, and controller circuitry configured in combination with the receiver circuitry to switch at a first periodic rate between a primary active operating mode and a primary reduced power operating mode in accordance with a primary discontinuous reception, DRX, operation, to monitor for signals transmitted by the other communications devices to the receiving communications device in one or more of the resource pool instances during the primary active operating mode, and to stop monitoring for signals transmitted by the other communications devices to the receiving communications device in one or more of the resource pool instances during the primary reduced power operating mode, wherein the first periodic rate is dependent on the resource pool periodicity.

Paragraph 26. A transmitting communications device comprising a transmitter configured to transmit signals to one or more other communications devices within sidelink communications resources of a plurality of resource pool instances of a sidelink interface, each of the resource pool instances being arranged in time in accordance with a resource pool periodicity, and a controller configured in combination with the transmitter to determine that a receiving communications device of the other communications devices is operating in accordance with a primary discontinuous reception, DRX, operation in which the receiving communications device switches at a first periodic rate between a primary active operating mode in which the receiving communications device will monitor for the signals transmitted by the transmitting communications device in one or more of the resource pool instances and a primary reduced power operating mode in which the receiving communications device will stop monitoring for signals transmitted by the transmitting communications device in one or more of the resource pool instances, and to transmit signals to the receiving communications device in accordance with the primary DRX operation, wherein the first periodic rate is dependent on the resource pool periodicity.

Paragraph 27. A method of operating a transmitting communications device configured to transmit signals to one or more other communications devices within sidelink communications resources of a plurality of resource pool instances of a sidelink interface, each of the resource pool instances being arranged in time in accordance with a resource pool periodicity, the method comprising determining that a receiving communications device of the other communications devices is operating in accordance with a primary discontinuous reception, DRX, operation in which the receiving communications device switches at a first periodic rate between a primary active operating mode in which the receiving communications device will monitor for the signals transmitted by the transmitting communications device in one or more of the resource pool instances and a primary reduced power operating mode in which the receiving communications device will stop monitoring for signals transmitted by the transmitting communications device in one or more of the resource pool instances, and transmitting signals to the receiving communications device in accordance with the primary DRX operation, wherein the first periodic rate is dependent on the resource pool periodicity.

Paragraph 28. Circuitry for a transmitting communications device comprising transmitter circuitry configured to transmit signals to one or more other communications devices within sidelink communications resources of a plurality of resource pool instances of a sidelink interface, each of the resource pool instances being arranged in time in accordance with a resource pool periodicity, and controller circuitry configured in combination with the transmitter circuitry to determine that a receiving communications device of the other communications devices is operating in accordance with a primary discontinuous reception, DRX, operation in which the receiving communications device switches at a first periodic rate between a primary active operating mode in which the receiving communications device will monitor for the signals transmitted by the transmitter circuitry in one or more of the resource pool instances and a primary reduced power operating mode in which the receiving communications device will stop monitoring for signals transmitted by the transmitter circuitry in one or more of the resource pool instances, and to transmit signals to the receiving communications device in accordance with the primary DRX operation, wherein the first periodic rate is dependent on the resource pool periodicity.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-172834, "Revised WID on New Radio Access Technology," NTT DOCOMO, RAN#78.
[3] TR 38.840, "NR: Study on UE Power Saving (Release 16, v0.1.0)", 3GPP, November 2018.
[4] TS 36.300, "Evolved Universal Terrestrial Radio Access (E-UTRA) and Evolved Universal Terrestrial Radio Access Network (E-UTRAN); Overall description; Stage 2 (Release 16, v16.0.0)", 3GPP, January 2020.
[5] TS 38.321, "NR: Medium Access Control (MAC) Protocol Specification (Release 15, v15.4.0)", 3GPP, January 2019.

What is claimed is:

1. A receiving communications device comprising
a receiver configured to receive signals from one or more other communications devices within sidelink communications resources of a plurality of resource pool instances of a sidelink interface, each of the resource pool instances being arranged in time in accordance with a resource pool periodicity, and
a controller configured in combination with the receiver
to switch at a first periodic rate between a primary active operating mode and a primary reduced power operating mode in accordance with a primary discontinuous reception, DRX, operation,
to monitor for signals transmitted by the other communications devices to the receiving communications device in one or more of the resource pool instances during the primary active operating mode, and
to stop monitoring for signals transmitted by the other communications devices to the receiving communications device in one or more of the resource pool instances during the primary reduced power operating mode, wherein
the first periodic rate is dependent on the resource pool periodicity, and
each of the resource pool instances is associated with an index value, and wherein the receiving communications device is configured to switch between the primary reduced power operating mode and the primary active operating mode at the start of a resource pool instance when a result of a function of the index value of the resource pool instance and a period defined by the first periodic rate is equal to a specified value.

2. A receiving communications device according to claim 1, wherein the first periodic rate is an integer multiple of the resource pool periodicity.

3. A receiving communications device according to claim 1, wherein the receiving communications device is configured to switch between the primary reduced power operating mode and the primary active operating mode at the start of a resource pool instance.

4. A receiving communications device according to claim 1, wherein the function is a modulo function.

5. A receiving communications device according to claim 1, wherein the receiving communications device is configured to receive an indication of the specified value via signalling from one of the other communications devices or from a mobile communications network.

6. A receiving communications device comprising:
a receiver configured to receive signals from one or more other communications devices within sidelink communications resources of a plurality of resource pool instances of a sidelink interface, each of the resource pool instances being arranged in time in accordance with a resource pool periodicity, and
a controller configured in combination with the receiver
to switch at a first periodic rate between a primary active operating mode and a primary reduced power operating mode in accordance with a primary discontinuous reception, DRX, operation,
to monitor for signals transmitted by the other communications devices to the receiving communications device in one or more of the resource pool instances during the primary active operating mode, and
to stop monitoring for signals transmitted by the other communications devices to the receiving communications device in one or more of the resource pool instances during the primary reduced power operating mode, wherein
the first periodic rate is dependent on the resource pool periodicity,
the receiving communications device is configured to switch from the primary active operating mode to the primary reduced power operating mode at the start of a first resource pool instance after the end of a current active period of the primary active operating mode, and
the switching rate between the primary active operating mode and the primary reduced power operating mode is defined by the first periodic rate.

7. A receiving communications device according to claim 1, wherein the receiving communications device is configured to enter the primary reduced power operating mode in accordance with the first periodic rate if no signals from the other communications devices have been received during a current instance of the primary active operating mode.

8. A receiving communications device according to claim 1, wherein the receiving communications device is configured to receive an indication of at least one parameter of the primary DRX operation and the first periodic rate via signalling from one of the other communications devices or from a mobile communications network.

9. A receiving communications device according to claim 1, wherein the controller is configured in combination with the receiver
to start, during a current instance of the primary active operating mode upon receiving a first signal from one of the other communications devices, an inactivity timer specifying an inactivity period comprising one or more resource pool instances during which the receiving communications device does not switch into the primary reduced power operating mode.

10. A receiving communications device according to claim 9, wherein the receiving communications device is configured to receive an indication of the inactivity period via Radio Resource Control, RRC, signalling from a mobile communications network.

11. A receiving communications device according to claim 9, wherein the inactivity period is predetermined and known to the receiving communications device.

12. A receiving communications device according to claim 9, wherein the receiving communications device is configured to receive an indication of the inactivity period via signalling from one of the other communications devices or from a mobile communications network.

13. A receiving communications device according to claim 9, wherein the receiving communications device is configured to monitor for further signals transmitted by one of the other communications devices to the receiving communications device in the one or more resource pool instances during the inactivity period.

14. A receiving communications device according to claim 9, wherein the receiving communications device is configured to enter the primary reduced power operating mode if no further signals from one of the other communications devices have been received during the inactivity period.

15. A receiving communications device according to claim 9, wherein the receiving communications device is configured, following the end of the inactivity period, to switch at least at a second periodic rate, between a secondary active operating mode and a secondary reduced power operating mode in accordance with a secondary DRX operation for the duration of a secondary DRX operation period, the second periodic rate being higher than the first periodic rate.

16. A receiving communications device according to claim 15, wherein the receiving communications device is configured to receive an indication of at least one parameter of the secondary DRX operation and the second periodic rate via signalling from one of the other communications devices or from a mobile communications network.

17. A receiving communications device according to claim 15, wherein the secondary DRX operation comprises a plurality of phases, each of the phases having a different value of at least one DRX parameter.

18. A method of operating a receiving communications device configured to receive signals from one or more other communications devices within sidelink communications resources of a plurality of resource pool instances of a sidelink interface, each of the resource pool instances being arranged in time in accordance with a resource pool periodicity, the method comprising
switching at a first periodic rate between a primary active operating mode and a primary reduced power operating mode in accordance with a primary discontinuous reception, DRX, operation,
monitoring for signals transmitted by the other communications devices to the receiving communications device in one or more of the resource pool instances during the primary active operating mode, and
stopping monitoring for signals transmitted by the other communications devices to the receiving communications device in one or more of the resource pool instances during the primary reduced power operating mode, wherein
the first periodic rate is dependent on the resource pool periodicity, and
each of the resource pool instances is associated with an index value, and wherein the receiving communications device is configured to switch between the primary reduced power operating mode and the primary active operating mode at the start of a resource pool instance when a result of a function of the index value of the resource pool instance and a period defined by the first periodic rate is equal to a specified value.

* * * * *